US005122255A

United States Patent [19]

Noda et al.

[11] Patent Number: 5,122,255

[45] Date of Patent: Jun. 16, 1992

[54] ATMOSPHERE CONTROL SYSTEM

[75] Inventors: Makoto Noda; Toru Kikuchi, both of Nagoya, Japan

[73] Assignee: NGK Insulators, Ltd., Japan

[21] Appl. No.: 440,806

[22] Filed: Nov. 24, 1989

[30] Foreign Application Priority Data

Nov. 24, 1988 [JP] Japan ............................... 63-294502

[51] Int. Cl.[5] ............................................ G01N 27/26

[52] U.S. Cl. ..................................................... 204/425

[58] Field of Search ......................................... 204/425

[56] References Cited

U.S. PATENT DOCUMENTS 3,860,498 1/1975 Jones .................................. 204/425

*Primary Examiner*—John Niebling

*Assistant Examiner*—Bruce F. Bell

*Attorney, Agent, or Firm*—Parkhurst, Wendel & Rossi

[57] ABSTRACT

An atmosphere control system, including, a standard gas supplying device for supplying a gas of a determined composition, an oxygen concentration controlling device connected to the standard gas supplying device for adjusting oxygen concentration of the gas of the determined composition, an atmosphere holding device connected to the oxygen concentration controlling device for receiving the oxygen concentration adjusted gas, and an oxygen concentration measuring device arranged at the upstream side of the atmosphere holding device between the standard gas supplying device and the oxygen concentration controlling device or between the oxygen concentration controlling device and the atmosphere holding device or at the downstream side of the atmosphere holding device for measuring oxygen concentration in the gas at the position of the oxygen concentration measuring device is provided. The present system can provide gases of low oxygen concentration, easily and precisely control oxygen concentration in the gas of the system, and prevent oxidization of articles in treating thereof in the atmosphere holding device.

5 Claims, 6 Drawing Sheets

ATMOSPHERE CONTROL SYSTEM

BACKGROUND OF THE INVENTION

1. Field of the Invention

The present invention relates to a system using a control device for adjusting oxygen concentration in a gas of the system to a desired value, particularly to an atmosphere control system using a control device for controlling the oxygen concentration in the gas of the system.

2. Related Art Statement

Heretofore, in case when an easily oxidizable metal in a determined concentration of oxygen, particularly in a low concentration of oxygen, is subjected to heat treatment, such as, carbonization, firing, or baking of paste, or annealing, commercial standard gases, such as a high purity Ar gas, an $N_2$ gas containing 2% of $O_2$, etc., are purchased and used as atmosphere gases in furnaces for such heat treatments and annealing.

However, in cases when using the above commercial standard gases, a standard gas of a completely desired oxygen concentration is difficult to obtain commercially, and such standard gas of the completely desired oxygen concentration can be obtained only with a very high increase of cost.

In cases when a standard gas of an extremely low oxygen concentration has to be used, even an $N_2$ gas, for example, which is considered not to contain oxygen, contains moisture or oxygen of a level of about 0.1-10 ppm already in a charged state in a high pressure gas vessel or bomb. Thus, a standard gas of an oxygen concentration below this level is difficult to obtain.

Therefore, in a process or system of heating and producing sensor elements using nickel, or stainless steel, etc., as a resistor or a lead wire, oxygen concentration of the atmosphere of the process is hard to control properly.

SUMMARY OF THE INVENTION

An object of the present invention is to obviate the above problems.

Another object of the present invention is to provide an atmosphere control system using a control device which can precisely control oxygen concentration in a gas of the system to a desired value.

The present invention is an atmosphere control system, comprising, a standard gas supplying device for supplying a gas of a determined composition, an oxygen concentration controlling device connected to the standard gas supply device for adjusting oxygen concentration of the gas of the determined composition, an atmosphere holding device connected to the oxygen concentration controlling device for receiving the oxygen concentration adjusted gas, and an oxygen concentration measuring device arranged at the upstream side of the atmosphere holding device between the standard gas supplying device and the oxygen concentration controlling device or between the oxygen concentration controlling device and the atmosphere holding device or at the downstream side of the atmosphere holding device for measuring oxygen concentration in the gas at the position of the oxygen concentration measuring device.

The atmosphere control system of the present invention can control precisely oxygen concentration of a gas which is to be supplied to the atmosphere holding device to a desired range. That is, even when a proper oxygen concentration in a gas of the atmosphere is a low concentration of below $10^{-4}$%, a gas of the proper oxygen concentration can be simply and easily attained.

In the arrangement of the atmosphere control system of the present invention, the oxygen concentration controlling device and the oxygen concentration measuring device can be combined to provide a gas of a continuously constant oxygen concentration or a gas of a stepwisely varying desired oxygen concentration to the atmosphere holding device, by always monitoring and controlling the oxygen concentration of the gas to a desired constant oxygen concentration by means of, for example, practicing a feedback controlling so as to impose a constantly or stepwisely scheduled program on the atmosphere holding device.

The oxygen concentration of the atmosphere holding device can be controlled to a proper range, as described above. Therefore, even when a substrate of a sensor element for measuring a flow rate or flow velocity, etc., of a gas based on a change of resistance value of the sensor element is constituted from ceramics such as $TiO_2$, or the like, ceramics which are easily reduced in a gas of a low oxygen concentration, and a lead wire is made of a metal, such as, Ni, stainless steel, or Cu, other than Pt, Au and Pd, which is oxidized by a gas of above a certain level of oxygen concentration, oxygen concentration of a gas of the atmosphere holding device at the time of heat treatment can be controlled to a range that the ceramics is not reduced while the metal is not oxidized, so that the sensor element can be produced without hindrance. This applies also to the case wherein glass is used instead of the ceramics.

A voltage of an electric current applied across an oxygen pump used in the present atmosphere control system can be controlled above a decomposition voltage of $H_2O$, $CO_x$, CO, or $CO_2$, so that carbon concentration resulting from decomposition of CO and $H_2$ concentration resulting from decomposition of $H_2O$, can be controlled.

BRIEF DESCRIPTION OF THE DRAWINGS

For a better understanding of the present invention, reference is made to the accompanying drawings, in which.

Figure 9:
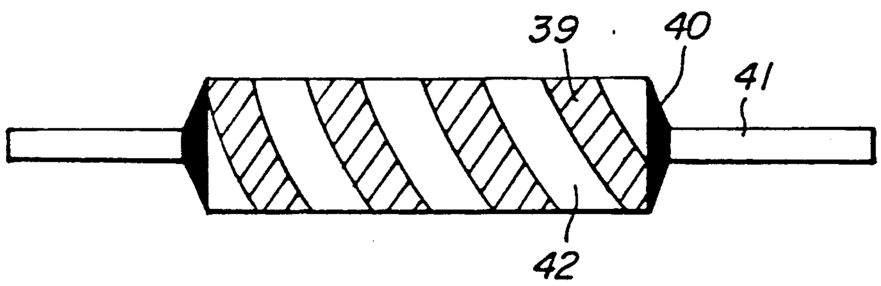
Figure 10:
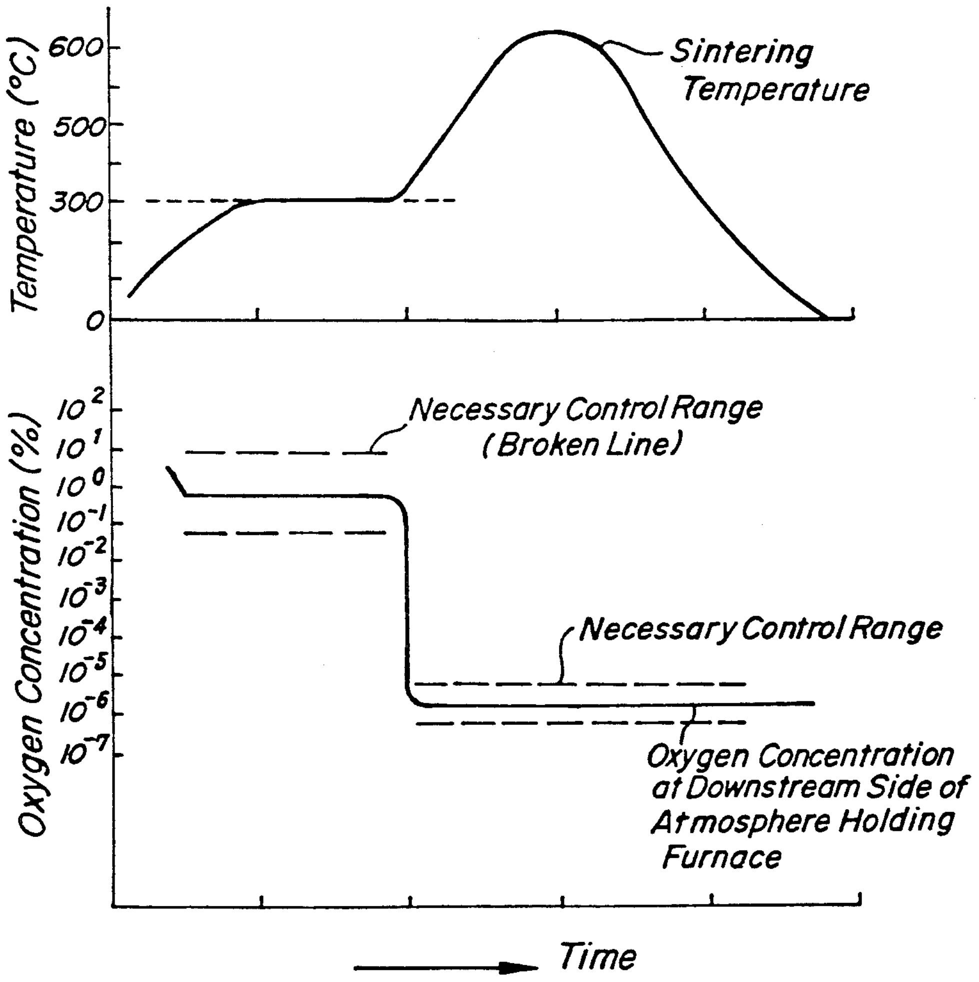

FIGS. *2a* and *2b* are other examples of the oxygen concentration control device, respectively;

FIGS. 3-8 are illustrative examples of a flow diagram of the present atmosphere control system, respectively;

FIG. 9 is a schematic explanational view of a sensor element obtained by using the present atmosphere control system; and FIG. 10 is a characteristic graph showing a heat curve at that time.

Numberings in the Drawings

1 - solid electrolyte body
2-1, 2-2 - electrode
3 - control circuit
4 - heater
5 - electric power source
6-1, 6-2 - sealing member
7-1, 7-2 - stainless pipe
11 - solid electrolyte body
12 - pipe line 13-1, 13-2 - electrode
14 - heater
15 - electric power source
16 - variable resistor
17 - temperature sensor
18 - oxygen concentration measuring device
21 - bomb
22 - flow meter
23 - oxygen concentration controlling device
24 - atmosphere holding furnace
25 - oxygen concentration measuring device
26 - displayer
27 - feedback circuit
28, 30 - feedforward circuit
29 - electric power source
31 - oxygen pump
32 - gas pressure adjuster
33 - check valve
34 - inlet portion
35 - circulation pump
36 - air filter
37 - pressurized air generator
38 - gas bomb
39 - resistor
40 - baked conductive paste
41 - lead wire
42 - alumina pipe

DESCRIPTION OF THE PREFERRED EMBODIMENTS

Hereinafter, the present invention will be explained in more detail with reference to Examples.

EXAMPLE 1

Figure 1:
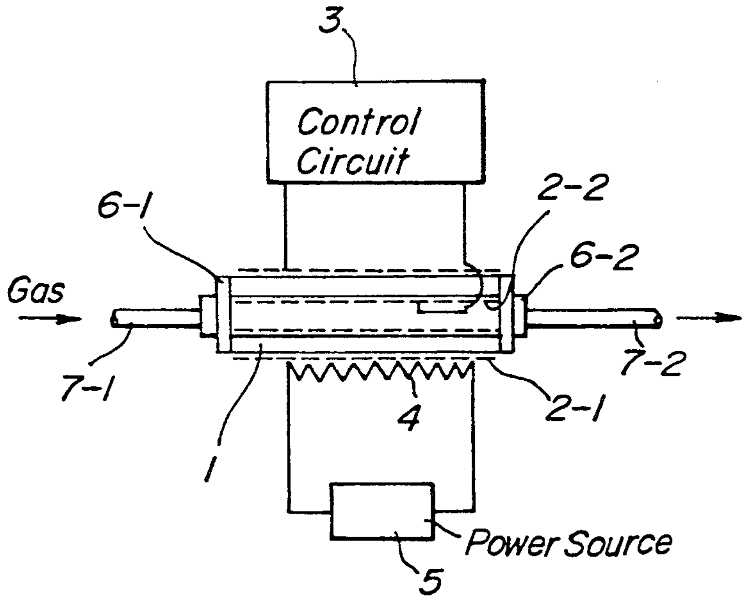
FIG. 1 is a schematic explanational view of an example of the oxygen concentration control device used in the present atmosphere control system.

Referring to FIG. 1, a structure of an embodiment of the oxygen concentration controlling device constituting the atmosphere control system of the present invention is shown in a flow diagram. In this embodiment, a pair of an outer electrode 2-1 and an inner electrode 2—2 made of a conductive material Pt is arranged on the outer and inner surfaces of a cylindrical solid electrolyte body 1 made of an oxygen ion conductive yttrium stabilized zirconia. Across the pair of electrodes 2-1, 2—2, a desired current is supplied from a control circuit 3 including an adjustable voltage power source. In order to improve initial response property of the oxygen pump, a heating device is provided consisting of a power source 5 and a heater 4 for heating the solid electrolyte body 1 and the electrodes 2-1, 2—2. The solid electrolyte body 1 has at its both ends stainless pipes 7-1, 7-2 via sealing members 6-1, 6-2 to constitute the atmosphere control system of the present invention.

In the above arrangement, if an electric current is passed through the solid electrolyte body 1 from the inner electrode 2—2 to the outer electrode 2-1 when a gas an oxygen concentration of which should be adjusted, is flowed from a stainless pipe 7-1 to a stainless pipe 7-2, oxygen in the exterior atmosphere such as air is supplied to the interior of the solid electrolyte body 1 through the solid electrolyte body 1. While, if an electric current is passed through the solid electrolyte body 1 from the outer electrode 2-1 to the inner electrode 2—2, oxygen of a gas in the solid electrolyte body 1 is discharged to the exterior through the solid electrolyte body 1. In this way, the oxygen concentration in the gas can be adjusted. A plurality of the oxygen concentration controlling device can be connected in series or parallel to form a broad oxygen concentration control system. In the above arrangement, a volt meter may be arranged in the control circuit 3 and a scale for representing oxygen concentrations may be graduated on the volt meter to provide an oxygen concentration meter.

In the above embodiment of FIG. 1, if for example 0.2 ppm of oxygen is introduced into a nitrogen gas containing 9.8 ppm of oxygen, a nitrogen gas containing 10 ppm of oxygen can be obtained. While, if 0.8 ppm of oxygen is discharged from the nitrogen gas containing 9.8 ppm of oxygen, a nitrogen gas containing 9 ppm of oxygen can be obtained.

In practice, a commercial $N_2$ bomb was used for supplying an $N_2$ gas and a constant electric current within a range of 1-3 mA was passed across the electrodes 2-1, 2—2 of the embodiment of FIG. 1 through the solid electric body 1 from the outer electrode 2-1 to the inner electrode 2—2 to discharge oxygen from the nitrogen gas, whereby the oxygen concentration of the nitrogen gas could be controlled within a range of $10^{-7}$-$10^{-12}$%.

EXAMPLES 2-3

Figure 2A:
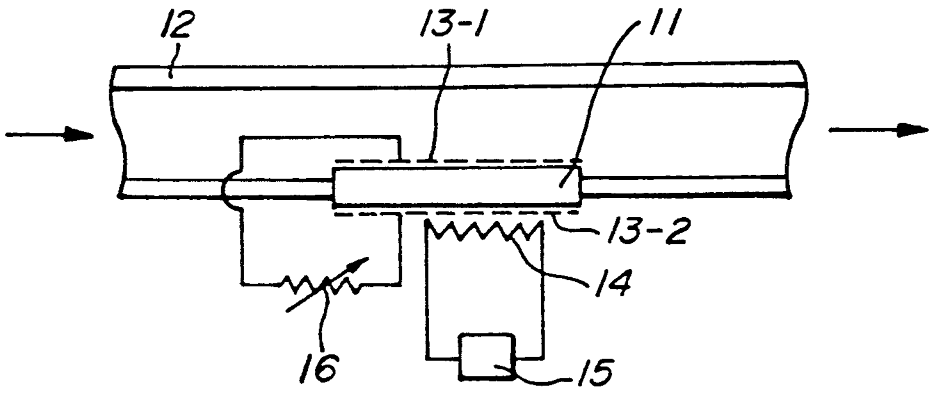
Figure 2B:
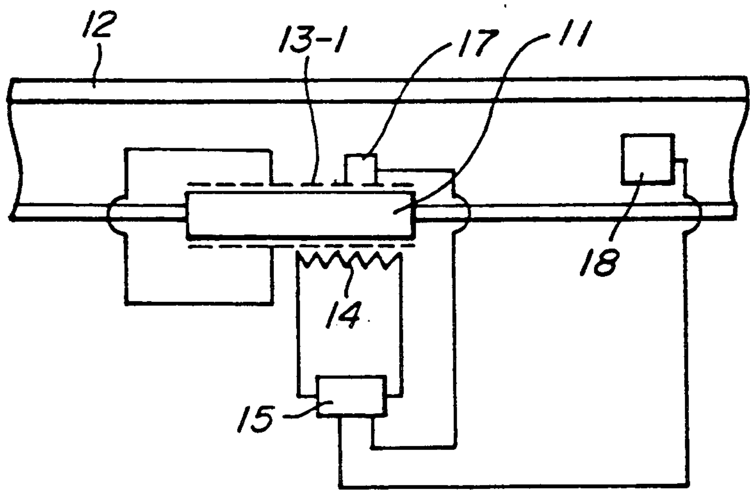

Referring to FIGS. 2*a* and 2*b*, a structure of another embodiment of the oxygen concentration controlling device is shown, respectively which is a constitutional element of the atmosphere control system of the present invention. In the embodiment shown in FIG. 2*a*, a planar solid electrolyte body 11 made of yttrium stabilized zirconia is arranged on a side wall of a pipe line 12 in which a gas or fluid to be adjusted is flowed, an electrode 13-1 is arranged in the pipe line 12 so as to be exposed to the flowing gas or fluid to be adjusted, and an electrode 13-2 is arranged on the outer surface of the pipe line 12 so as to be exposed to the exterior atmosphere, such as, air. A heating device consisting of a heater 14 and an electric power source 15 is arranged to heat the outer electrode 13-2 and the solid electrolyte body 11. In addition, the inner electrode 13-1 and the outer electrode 13-2 are electrically connected to each other via a variable resistor 16. Due to the electrical connection, an electromotive force is generated in the solid electrolyte body 1 between the electrodes 13-1, 13-2 to pass an electric current between the electrodes across the solid electrolyte body 1 and oxygen is transferred by a pumping action, and the oxygen concentration of the fluid is adjusted by varying the electric current by changing the resistance value of the variable resistor 16. The adjustment of the oxygen concentration can be effected also by varying the heating temperature of the outer electrode 13-2 and the solid electrolyte body 1. In the embodiment shown in FIG. 2*a*, the controlling device is constituted to include at least one resistor, and an adjustment of the oxygen concentration of the fluid is possible only in one direction of either pumping out oxygen from the fluid or pumping oxygen into the fluid from the exterior atmosphere, so that pumping of oxygen in two directions as was possible in the above embodiment of Example 1 is not possible in this embodiment.

In the embodiment shown in FIG. 2*b*, a variation of the embodiment of FIG. 2*a* is shown. A difference of this embodiment from the embodiment of FIG. 2*a* is the use of the internal resistance of a solid electrolyte body 11 without providing a variable resistor 16, and an adjustable voltage power source is used as a power source 15 to effect feedback controlling based on the temperature of the solid electrolyte body 11 expressed by a temperature sensor 17, and the oxygen concentration in the fluid or gas after being adjusted coming from an oxygen concentration measuring device 18 arranged at the downstream side of the gas pipe line 12, so as to obtain an always constant oxygen concentration. In the embodiment shown in FIG. 2*b*, too, adjustments of the oxygen concentration of the fluid are possible in only one direction, i.e. pumping out of oxygen from the fluid or pumping of oxygen into the fluid, similarly as in the embodiment of FIG. 2*a*. In the embodiment of FIG. 2*b*, an ampere meter can be arranged in the electrically connected circuit between the electrodes 13-1 and 13-2 for utilizing informations given by the ampere meter as a parameter for the feedback controlling, in order to achieve a more precise controlling of the oxygen concentration of the fluid.

EXAMPLES 4-9

Attached FIGS. 3-8 represent respectively an embodiment of the structure of the atmosphere control system of the present invention.

Figure 3:
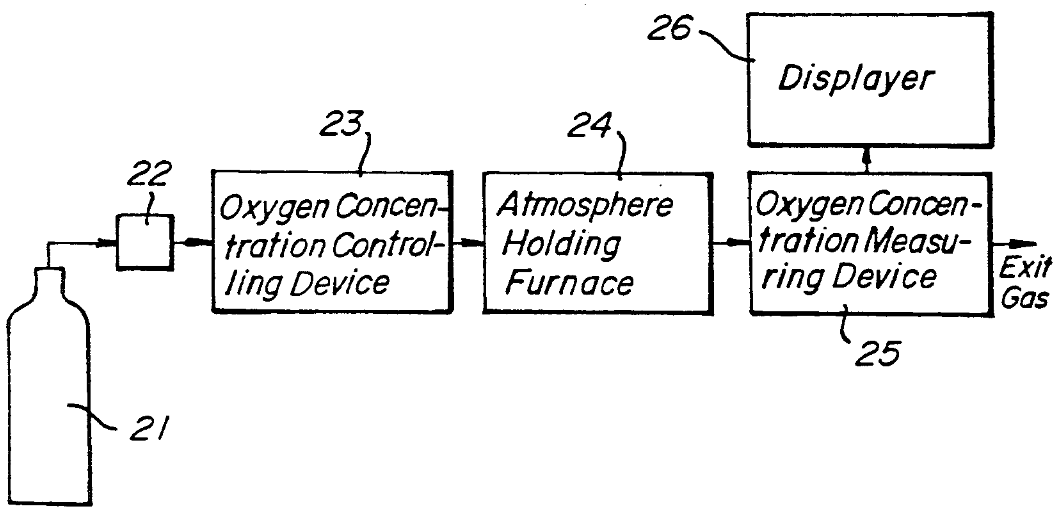

Referring to FIG. 3, an embodiment of the atmosphere control system is shown as Example 4, wherein reference numeral 21 is a bomb of Ar gas, $N_2$ gas, or the like gas as a device for supplying the standard gas, reference numeral 22 is a flow meter for measuring a supplying amount of the gas supplied from the bomb 21, reference numeral 23 is an oxygen concentration controlling device constituting the present atmosphere control system, reference numeral 24 is an atmosphere holding furnace which is supplied with an adjusted gas, reference numeral 25 is an oxygen concentration measuring device for measuring an oxygen concentration in the gas exited from the atmosphere holding furnace 24, and reference numeral 26 is a displayer for displaying an oxygen concentration of the exited gas measured by the oxygen concentration measuring device 25. In this embodiment, the oxygen concentration measuring device 25 is arranged at the downstream side of the atmosphere holding furnace 24, and voltage, and heating temperature, etc., of the oxygen concentration control device 23 are manually controlled, observing the oxygen concentration value displayed by the displayer 26, to obtain a constant oxygen concentration. For instance, in the atmosphere control system shown in this embodiment, if an $N_2$ gas is used as a standard gas, $N_2$ gases containing oxygen at orders of, for example, $10^{-11}\%$, 1 ppm, or 100 ppm, etc., can be supplied to the atmosphere holding furnace 24.

In the embodiments of Examples 5-9 shown in FIGS. 4-8, same reference numbers represent the same members or devices as those of FIG. 3, so that explanations thereof are omitted herein.

Figure 4:
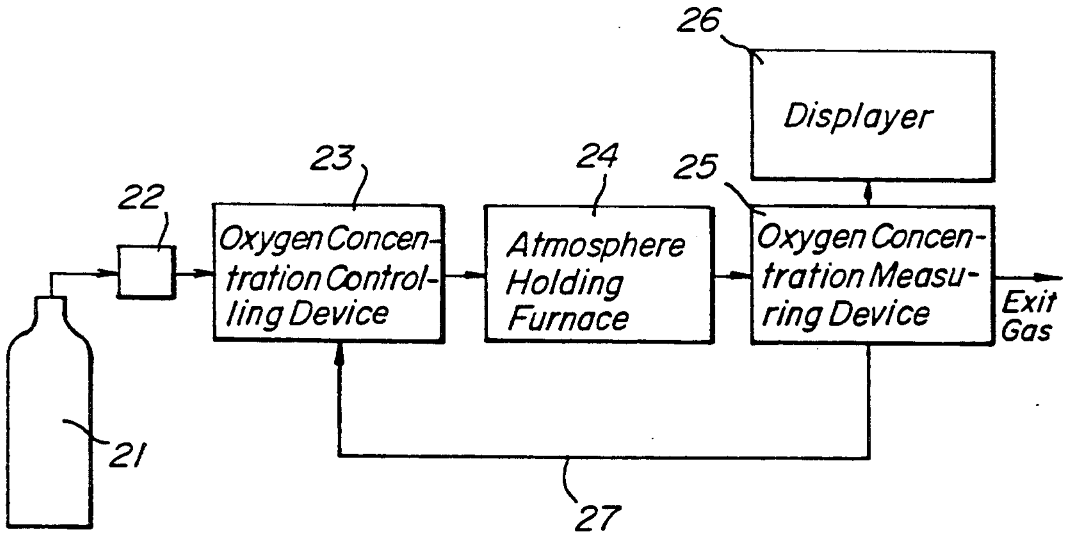

In the embodiment of Example 5 shown in FIG. 4, the atmosphere control system has the same arrangement as that of FIG. 3, except that the system has a feedback circuit 27 for feeding back data of the oxygen concentration of the gas measured by the oxygen concentration measuring device 25 to the oxygen concentration controlling device 23 to perform automatic controlling.

Figure 5:
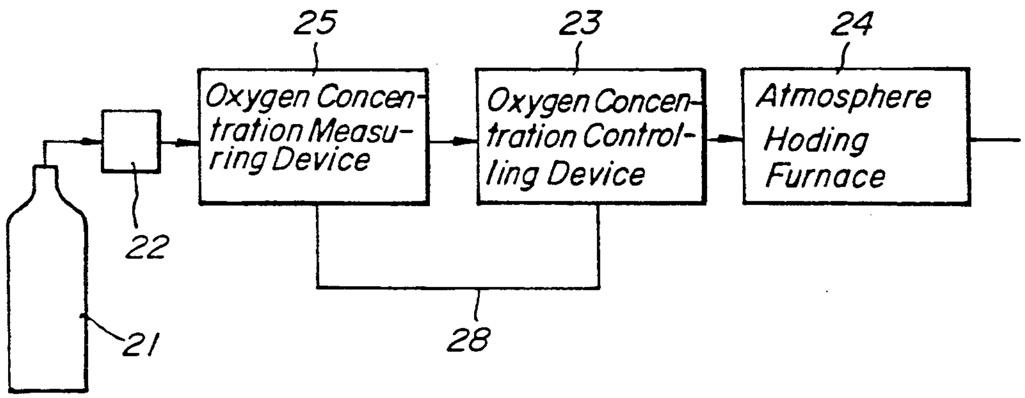

In the embodiment of Example 6 shown in FIG. 5, the oxygen concentration measuring device 25 is arranged at the upstream side of the atmosphere holding device 24 between the bomb 21 and the oxygen concentration controlling device 23. In this embodiment, a feed-forward circuit 28 is arranged wherein the oxygen concentration of the gas to be adjusted is measured beforehand, and the measured oxygen concentration values are supplied or forwarded to the downstream side oxygen concentration controlling device 23, in order to effect automatic controlling.

Figure 6:
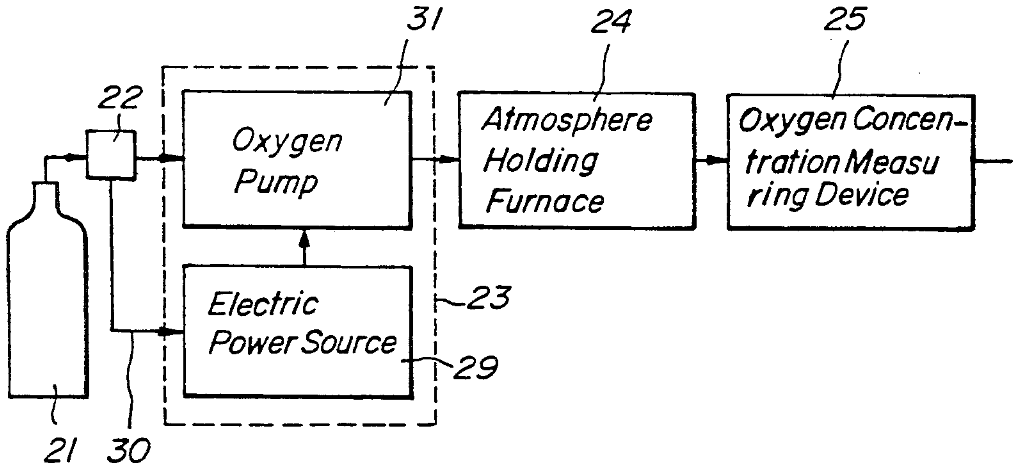

In the embodiment of Example 7 shown in FIG. 6, the atmosphere control system has substantially the same arrangement as that of FIG. 3, except that the data of the flow rates measured by the flow meter 22 are supplied to the adjustable electric power source 29 of constant voltage of the oxygen concentration controlling device 23 via a feedforward circuit 30 to control an oxygen pump 31.

Figure 7:
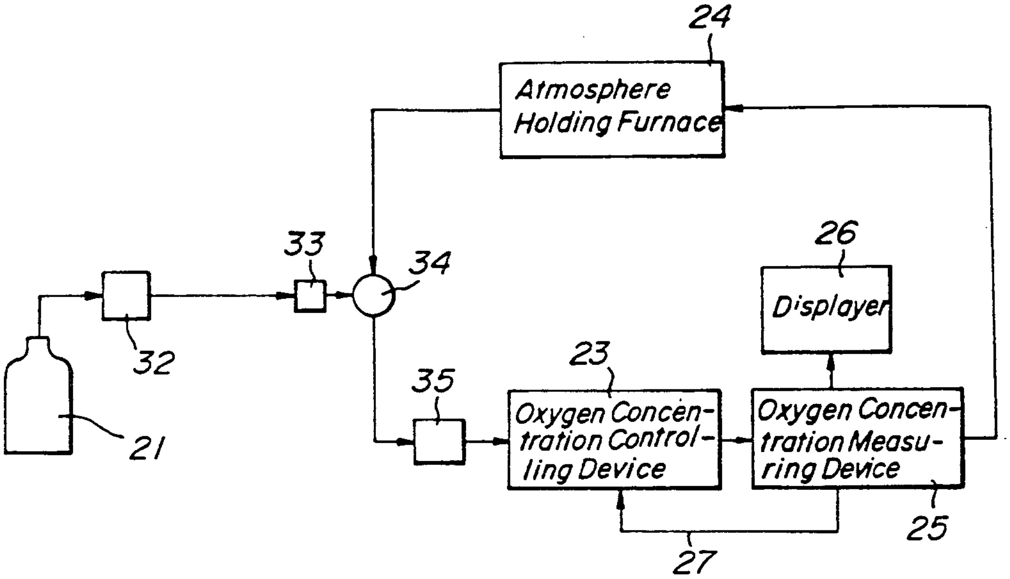

In the embodiment of Example 8 shown in FIG. 7, the oxygen concentration measuring device 25 is arranged at the upstream side of the atmosphere holding furnace 24 between the oxygen concentration controlling device 23 and the atmosphere holding furnace 24, and a closed circuit is formed therebetween so as to control decrease or increase of the oxygen concentration of the gas due to reactions in the atmosphere holding furnace 24 or leakage in the system. That is, a gas to be adjusted supplied from the bomb 21 is supplied to the closed circuit through a gas pressure fixing adjuster 32, a check valve 33, and an inlet portion 34, and a circulation pump 35 is arranged at the upstream side of the oxygen concentration controlling device 23.

Figure 8:
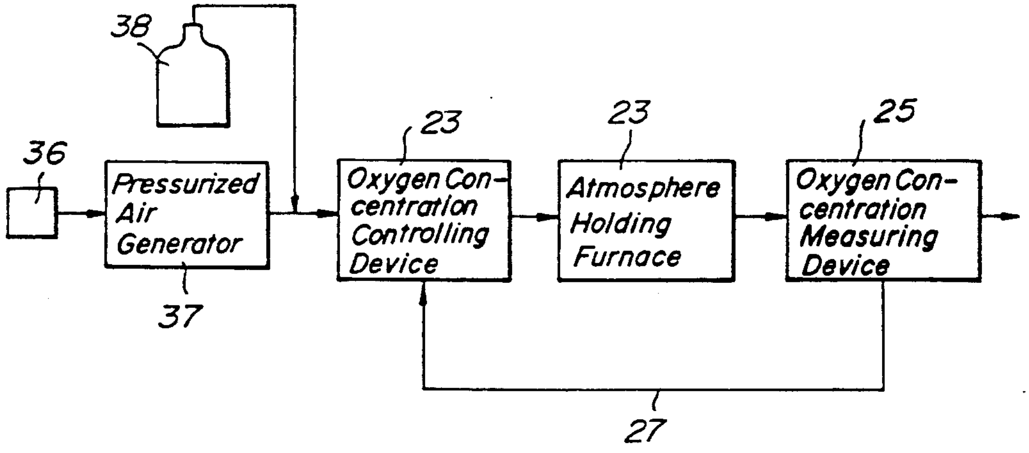

In the embodiment of Example 9 shown in FIG. 8, the atmosphere control system has substantially the same arrangement as that of Example 4, wherein a gas of an arbitrary composition is prepared and used as the gas to be adjusted by introducing a reducible gas from a gas bomb 38 storing a reducible gas, such as LNG, propane, $H_2$, CO, or $CO_2$, etc., into air supplied to the oxygen concentration measuring device 23 through an air filter 36 and a pressurized air generator 37.

EXAMPLE 10

In this example, an example of a sensor element is shown as in FIG. 9. A resistor 39 and a lead wire 41 are electrically connected by a baked conductive paste 40 which also fixes the lead wire 41 firmly to the resistor 39. As the resistor 39, use is made of various conductive material. In this embodiment, the resistor 39 is made of a thin film of platinum, the lead wire 41 is made of an alloy of nickel and iron, and the conductive paste is made of mainly platinum powder, nickel powder, glass powder of a melting point of 650° C., and a binder which disappears by burning at about 300° C. The lead wire 41 is fixed to an aluminum pipe 42 by the conductive paste 40, and then the conductive paste 40 is baked at 650° C. while controlling the oxygen concentration of the baking atmosphere.

The atmosphere control system is the same as that of FIG. 3, and the bomb gas is $N_2$.

EXAMPLE 11

In this example, a characteristic curve of temperature at sintering of the above sensor element, a control range of the oxygen concentration at the sintering, and the oxygen concentration at the downstream side of the atmosphere holding furnace, are shown. The atmosphere control system of the present invention can control stepwisely the oxygen concentration in the sintering procedure of the sensor element using a same gas, as shown in this example. As a result, the lead wire 41 can be fixed to the resistor 42 without causing oxidation of the lead wire 41, decomposition of the conductive paste glass 40, and formation of foaming.

In the above example, conductive metal oxide, for example, may be used as the electrode material, instead of the metallic electrodes used as the pair of conductive material. Also, plural pairs of electrically conductive material may be used as the electrodes for achieving the same effects, instead of using a pair of electrically conductive material as the electrodes.

Though the atmosphere holding furnace is used as the atmosphere holding device in the above examples, the present invention is also applicable and effective to another devices for adjusting another atmosphere e.g. a device for highly purifying inert gases at the time of introducing an inert gas in a gas vessel.

As apparent from the foregoing explanations, the atmosphere control system of the present invention can control oxygen concentration in a gas precisely by means of an oxygen pump using an oxygen ion conductive solid electrolyte body.

The atmosphere control system of the present invention using the oxygen concentration controlling device can supply always a gas of a desired constant concentration of oxygen to the atmosphere holding device, by combining the atmosphere holding device with the oxygen concentration controlling device.

Although the present invention has been explained in detail with reference to specific examples and numeral values, the present invention is not limited thereto, and many variations and modifications thereof are possible without departing from the broad spirit and aspect of the present invention as defined in the appended claims.

What is claimed is:

1. An atmosphere control system, comprising:

(a) a standard gas supplying device for supplying a gas of a constant, known composition;

(b) an oxygen concentration controlling device connected to the standard gas supplying device for adjusting oxygen concentration of the gas supplied from the standard gas supplying device;

(c) an atmosphere holding device connected to the oxygen concentration controlling device for receiving the oxygen concentration adjusted gas; and (d) an oxygen concentration measuring device formed separate from said oxygen concentration controlling device and being arranged in communication with the gas at a position selected from the group consisting of (i) an upstream side of the atmosphere holding device between the standard gas supplying device and the oxygen concentration controlling device, (ii) between the oxygen concentration controlling device and the atmosphere holding device or (iii) at the downstream side of the atmosphere holding device, for measuring oxygen concentration in the gas at the position of the oxygen concentration measuring device.

2. The atmosphere control system of claim 1, wherein the atmosphere holding device is a heating atmosphere device.

3. The atmosphere control system of claim 1, further comprising an oxygen pump consisting of an oxygen ion conductive solid electrolyte body, at least one pair of electrodes arranged adjacent to the oxygen ion conductive solid electrolyte body, and a circuit device for applying a desired voltage or passing a desired current between the pair of electrodes, wherein one of the electrodes is arranged to contact with a gas, an oxygen concentration of which is to be adjusted, and the electrodes are arranged to allow application of a desired voltage or passage of a desired current therebetween.

4. A method of controlling the oxygen concentration of a gas contained in an atmosphere holding device, comprising the steps of:

providing a standard gas supplying device for supplying a gas of a constant, known composition;

disposing an oxygen concentration controlling device in communication with said standard gas supplying device for adjusting oxygen concentration of the gas supplied from the standard gas supplying device;

introducing the oxygen concentration adjusted gas to an atmosphere holding device;

arranging an oxygen concentration measuring device at a position selected from the group consisting of (i) an upstream side of the atmosphere holding device between the standard gas supplying device and the oxygen concentration controlling device, (ii) between the oxygen concentration controlling device and the atmosphere holding device or (iii) at the downstream side of the atmosphere holding device; and measuring the oxygen concentration in the gas at the position of the oxygen concentration measuring device.

5. The method of claim 4, wherein said atmosphere holding device is a furnace.

* * * * *